(12) United States Patent
Sedlak

(10) Patent No.: US 6,510,514 B1
(45) Date of Patent: Jan. 21, 2003

(54) DEVICE FOR RELIABILITY CREATING ELECTRONIC SIGNATURES

(75) Inventor: Holger Sedlak, Egmating (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/499,566

(22) Filed: Feb. 7, 2000

Related U.S. Application Data

(63) Continuation of application No. PCT/DE98/02034, filed on Jul. 20, 1998.

(30) Foreign Application Priority Data

Aug. 6, 1997 (DE) .......................................... 197 34 029

(51) Int. Cl.$^7$ ................................................. H04L 9/30
(52) U.S. Cl. ............................ 713/159; 380/51; 705/67
(58) Field of Search ................................. 713/176, 159; 380/51; 705/67; 235/380, 382

(56) References Cited

U.S. PATENT DOCUMENTS

| | | | | |
|---|---|---|---|---|
| 5,293,029 A | * | 3/1994 | Iijima ......................... | 235/380 |
| 5,577,121 A | * | 11/1996 | Davis et al. .................. | 705/67 |
| 5,745,571 A | * | 4/1998 | Zuk ............................ | 380/285 |
| 5,892,211 A | * | 4/1999 | Davis et al. ................. | 235/380 |
| 5,912,974 A | * | 6/1999 | Holloway et al. ............ | 380/51 |
| 5,917,913 A | * | 6/1999 | Wang et al. .................. | 705/67 |
| 6,016,957 A | * | 1/2000 | Ohki et al. .................. | 235/380 |

FOREIGN PATENT DOCUMENTS

DE   42 31 913 A1   1/1994

OTHER PUBLICATIONS

International Publication No. WO 97/12460 (Bisbee et al.), dated Apr. 3, 1997.

\* cited by examiner

*Primary Examiner*—Gilberto Barron
(74) *Attorney, Agent, or Firm*—Laurence A. Greenberg; Werner H. Stemer; Gregory L. Mayback

(57) ABSTRACT

A device for reliably creating electronic signatures that includes a data carrier read/write device, a data generating device, and a display device. The data carrier read/write device is for receiving a portable data carrier storing a user-specific key and an algorithm used to generate an electronic signature. The data generating device is connected to the data carrier read/write device for transmitting data to the data carrier read/write device. The display device is connected to the data generating device to display the data that has been transmitted to the data carrier read/write device. The data carrier read/write device includes an actuating element operatively connected to the data carrier read/write device and operatively connected to the portable data carrier when the portable data carrier is received by the data carrier read/write device. The data carrier read/write device is configured to encrypt the data that has been transmitted to the data carrier read/write device to form the electronic signature only when the actuating element is actuated by a user.

4 Claims, 1 Drawing Sheet

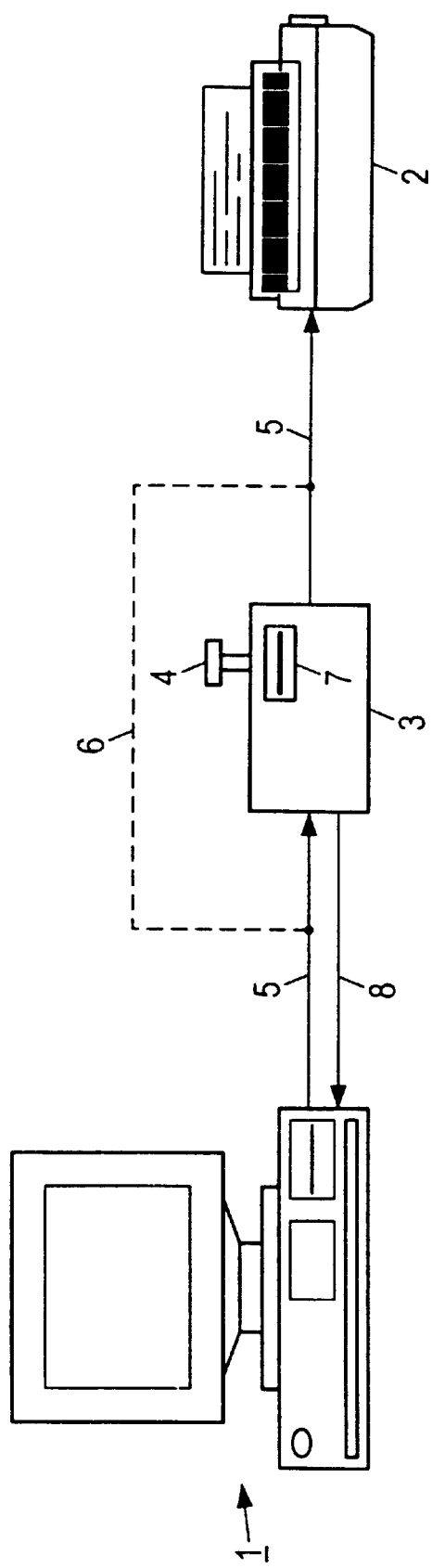

DEVICE FOR RELIABILITY CREATING ELECTRONIC SIGNATURES

CROSS-REFERENCE TO RELATED APPLICATION

This is a continuation of copending International Application PCT/DE98/02034, filed Jul. 20, 1998, which designated the United States.

BACKGROUND OF THE INVENTION

Field of the Invention

In addition to the handwritten signature customary today, there is a need, particularly with documents and also with arbitrary data records, for an electronic signature to be possible and legally recognized. In this context, the use of an electronic signature means that a hash value for the data that is to be signed is encrypted and this encrypted form is transmitted to the recipient together with the original data. A hash value is a form of the original data that has been encrypted or transformed by a one-way function. Since the recipient knows from whom the data originates, the recipient can use a key that is assigned to the sender and is known to the recipient to decrypt the encrypted data, and the recipient can transform the original data received using the hash function that is also known to him. The recipient can infer the correctness of the signature from the match between the transformed original data and the decrypted data and, in this manner, can unambiguously associate the data received with the aforementioned sender.

Such a method has been disclosed in WO 97/12460.

To ensure that the signature is extremely difficult to forge, complex algorithms have to be used for encryption. However, on the one hand, this means that the data to be encrypted must be in as compact a format as possible in order to keep the encryption time as short as possible.

On the other hand, however, programs such as those sold under the trademarks WINWORD and EXCELL are used to create the original data in order to obtain as clear and user-friendly a representation as possible. However, such original data files then contain contain a wealth of control characters, which often take up more space than the actual "useful data".

Devices or systems for producing electronic signatures, that is to say, in general terms, for encrypting data, usually have a PC which is usually provided with peripheral units such as a screen, a keyboard and a printer.

Data is advantageously encrypted using smart cards which store the encryption algorithm or algorithms and the secret key or keys assigned to the user. This means that each user is able to carry his key and the algorithm or algorithms with him easily so that any PC or other devices, such as fax or telex machines, can be used. There is thus an additional need for a smart card reader which, in present-day systems, is controlled by the operating system of the PC or of another data creation and/or a transmission medium.

Since the data to be encrypted must be in as compact a format as possible, it will thus generally be in a different format, at the time of encryption, than the format shown on the screen. However, this means that the user can never be sure whether the data that is to be encrypted really corresponds to the data currently being displayed on the screen. This is of increased concern as electronic signatures are usefully used on networked PCs in order to be able to send documents signed in this manner directly from the PC to the recipient via the network. However, this provides the possibility that files can be loaded into the PC via the network that allow manipulation of the data which is to be encrypted.

In this way, it is possible that, although a delivery order for a company X is displayed on the screen, files which are unknown to the user and have been loaded into his PC via the network cause a delivery order for the company Y to be transmitted to the smart card reader, whereupon the delivery order is provided with the electronic signature and is then sent to the company Y.

This opportunity for abuse would probably be easy to spot, so that the customer would suffer no actual damage, but this would mean that an electronic signature would be worthless in the legal sense and would not be generally recognized.

SUMMARY OF THE INVENTION

It is accordingly an object of the invention to provide a device that can assure that the data to be signed actually corresponds to the data provided by the user.

With the foregoing and other objects in view there is provided, in accordance with the invention, a device for reliably creating electronic signatures that includes a data carrier read/write device, a data generating device, and a display device. The data carrier read/write device is for receiving a portable data carrier storing a user-specific key and an algorithm used to generate an electronic signature. The data generating device is connected to the data carrier read/write device for transmitting data to the data carrier read/write device. The display device is connected to the data generating device to display the data that has been transmitted to the data carrier read/write device. The data carrier read/write device includes an actuating element operatively connected to the data carrier read/write device and operatively connected to the portable data carrier when the portable data carrier is received by the data carrier read/write device. The data carrier read/write device is configured to encrypt the data that has been transmitted to the data carrier read/write device to form the electronic signature only when the actuating element is actuated by a user.

In accordance with an added feature of the invention, the data carrier read/write device is connected between the data generating device and the display device.

In accordance with an additional feature of the invention, the data carrier read/write device is connected in parallel with the display device.

In accordance with a concomitant feature of the invention, the data carrier read/write device is certified by an approved authority.

In most PC systems, it is possible to connect different peripheral units from all possible manufacturers. In order for the PC to be able to communicate with these peripheral units, so-called drivers, for example display screen drivers or printer drivers, need to be installed in the operating system.

These drivers are programs that use a standard format to create a data format that can be read by the appropriate screen or printer. It is therefore customary to provide a PC with the possibility of creating such a standard format from the PC's own format. Programs are likewise used for this, and these are called front end drivers, whereas the peripheral unit drivers are called back end drivers.

There is currently still no uniform standard format, however, roughly half of all PCs on the market have access to the so-called PostScript format. Most peripheral units can also be driven directly using this PostScript format.

According to the invention, a line between the PC and a displaying peripheral unit, or in parallel with the peripheral unit, is provided with a certified data medium read/write device into which the data to be signed is read and this data can be shown on the displaying peripheral unit, for example a printer or a screen, for the purpose of checking for correctness. The electronic signature is created or the signed data is sent back to the PC only after active confirmation by the user. This ensures that this confirmation procedure cannot be controlled by the PC.

The advantage provided by this device is that the user can check the displaying peripheral unit to see which data has been read into the smart card for signing. Although the representation is not as convenient as in known commercial word processing programs, there is the assurance that the format is the same as the format of the data that has been read into the smart card. In this way there could have been no manipulation by a further program possibly loaded into the PC. Since the data medium read/write device is completely self-sufficient and cannot be driven by the PC, but merely obtains data from the PC, there is no opportunity for abuse. However, a precondition for this is that this data medium read/write device is "certified", that is to say that it must be checked by an approved authority and sealed, for example.

The data medium read/write device advantageously has a button or other actuating element which the user or signer has to press before the signed document or piece of writing is created and/or sent. It is up to the signer, as is also the case with the signature hitherto, whether he wishes to check the correctness of the piece of writing or whether he is simply just signing, for example by pressing a button. In any case, actuating the actuating element signifies a clear expression of intent.

Other features which are considered as characteristic for the invention are set forth in the appended claims.

Although the invention is illustrated and described herein as embodied in a device for reliably creating electronic signatures, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE shows a simplified basic illustration of the invention.

DESCRIPTION OF THE PREFERRED EMBODIMENTS

The data creation device 1 shown in the FIGURE is a personal computer. However, in the context of the invention, other data creation devices, for example a fax machine or a telex machine, are also conceivable. A fax machine is also called a data creation device here because data in written form is converted into an electronic form. The data creation device 1 is connected via lines 5 to a peripheral display device 2, which is a printer in the example shown. A data medium read/write device 3 is connected in between. However, as indicated by a line 6 depicted in dashes, it can also be connected in parallel with the display device 2. It is also conceivable for the display device 2 to be a component part of the data medium read/write device 3.

The data medium read/write device 3 has an insertion slot 7 into which a smart card (not shown) can be inserted. This smart card contains the algorithm and the secret key that are used to encrypt data transmitted from the data creation device 1 to the data medium read/write device 3 via the line 5, that is to say that they are used to process the data to produce an electronic signature.

The encrypted data representing the electronic signature is transmitted back to the data creation device 1 via a line 8. The lines 5 and 8 can, of course, also be in the form of a bidirectional line.

The essential component of the invention is an actuating element 4 which, in the example shown, is in the form of a button to be pressed by the user. The electronic signature is created and/or is transmitted from the data medium read/write device 3 to the data creation device 1 only when the user has pressed this button 4.

The device according to the invention ensures that the data that is to be encrypted by the data medium read/write device 3, into which the smart card has been inserted into, is identical to the data shown by the display device 2. By insuring that the data to be encrypted is identical to the shown data, the inventive device allows an unambiguous signature to be provided. By actuating the button 4, an unambiguous signature is effected which represents a clear expression of intent in the legal sense as well. However, one precondition for general recognition of such an electronic signature will be that the data medium read/write device 3 is "certified" by an approved authority, that is to say that it is tested and sealed as being faultless.

I claim:

1. A device for reliably creating electronic signatures, comprising:
   a data carrier read/write device for receiving a portable data carrier storing a user-specific key and an algorithm used to generate an electronic signature;
   a data generating device connected to said data carrier read/write device transmitting data to said data carrier read/write device; and
   a display device connected to said data generating device to display the data that has been transmitted to said data carrier read/write device;
   said data carrier read/write device including an actuating element operatively connected to said data carrier read/write device and operatively connected to the portable data carrier when the portable data carrier is received by said data carrier read/write device; and
   said data carrier read/write device configured to encrypt the data that has been transmitted to said data carrier read/write device to form the electronic signature only when said actuating element is actuated by a user.

2. The device according to claim 1, wherein said data carrier read/write device is connected between said data generating device and said display device.

3. The device according to claim 1, wherein said data carrier read/write device is connected in parallel with said display device.

4. The device according to claim 1, wherein said data carrier read/write device is certified by an approved authority.

* * * * *